United States Patent [19]
Arakawa et al.

[11] Patent Number: 6,103,854
[45] Date of Patent: Aug. 15, 2000

[54] ORGANIC-INORGANIC HYBRID POLYMER MATERIAL AND PROCESS FOR PREPARING THE SAME

[75] Inventors: Motoomi Arakawa, Osaka; Kazuaki Sukata, Yawata; Yasuyuki Agari, Osaka; Masayuki Shimada, Sakai, all of Japan

[73] Assignees: Orient Chemical Industries, Ltd., Osaka; Osaka Municipal Government, Osaka-fu, both of Japan

[21] Appl. No.: 09/196,787

[22] Filed: Nov. 20, 1998

[30]   Foreign Application Priority Data

| Nov. 21, 1997 | [JP] | Japan | 9-321012 |
| Nov. 28, 1997 | [JP] | Japan | 9-327842 |
| Mar. 9, 1998 | [JP] | Japan | 10-056625 |

[51] Int. Cl.⁷ .................................................. C08G 64/00
[52] U.S. Cl. ........................................... 528/196; 528/198
[58] Field of Search ..................................... 528/176, 196

[56]       References Cited

FOREIGN PATENT DOCUMENTS

| 0 413457 A1 | 2/1991 | European Pat. Off. . |
| 0 496109 A2 | 7/1992 | European Pat. Off. . |
| 63-57642 | 3/1988 | Japan . |
| 3-103486 | 4/1991 | Japan . |
| 5-43679 | 2/1993 | Japan . |
| 5-86188 | 4/1993 | Japan . |
| 8-104710 | 4/1996 | Japan . |
| 8-104711 | 4/1996 | Japan . |

OTHER PUBLICATIONS

J. Appl. Polym. Sci., vol. 35, pp. 2039–2051, (1988.).
Macromolecules, vol. 24, No. 6, p. 1431, (1991.).
Macromolecules, vol. 25, p. 4309, (1992.).
Makromol. Chem. Macromol. Symp., vol. 42/43, p. 303, 1991.
J. Inorg. Organomet. Polym., vol. 5, No. 4, pp. 343 to 375, 1995.
J. Appl. Polym. Sci., vol. 58, p. 1263, 1995.

*Primary Examiner*—Terressa M. Boykin
*Attorney, Agent, or Firm*—Birch, Stewart, Kolasch & Birch, LLP

[57]           ABSTRACT

According to the present invention, the characteristics of an inorganic material are suitably supplied to an organic material, and the characteristics of an organic material are suitably supplied to an inorganic material. The organic-inorganic hybrid polymer is obtained by the process in which a polymer having a polycarbonate and/or a polyarylate moiety as a main frame and having a metal alkoxide group as a functional group, is hydrolyzed and polycondensed to form crosslinkages. Another process is that in which a polymer having a polycarbonate and/or a polyarylate moiety as a main frame and having a metal alkoxide group as a functional group, and a metal alkoxide compound are cohydrorized and copolycondensed to form crosslinkages.

18 Claims, 4 Drawing Sheets

ORGANIC-INORGANIC HYBRID POLYMER MATERIAL AND PROCESS FOR PREPARING THE SAME

FIELD OF THE INVENTION

The present invention relates to a polymer material which is useful for various kinds of plastic materials, resin additives, and coating materials.

BACKGROUND OF THE INVENTION

Various inorganic materials are now widely employed for industrial use in consideration of both property of the material and requirement of the use. A silicic ceramic material, for example, is excellent in mechanical strength, chemical resistance, and thermal stability. A silicic material such as silicone oxide, and titanium oxide additionally has excellent optical properties.

Since the inorganic material is hard and brittle, it is generally difficult to mold and to process the inorganic material. The inorganic material is also poor in adhesiveness with an organic material, and therefore the use is restricted.

On the other hand, the organic polymer is flexible and is easily processed. However, their hardness and thermal stability are largely inferior to those of the inorganic material.

Therefore, there is great demand for the material which is able to complement to each other in their properties, and is able to make the use of the respective advantages thereof.

In respect of the problem, for improving physical properties of a plastic material such as surface hardness, gloss, soil resistance, hardness, heat resistance, weather resistance, and chemical resistance, studies of organic-inorganic hybrid polymer material has been made in which an inorganic element such as Si, Ti, and Zr is incorporated.

In the process for preparing the organic-inorganic hybrid polymer material, it is known that an organic monomer or an organic polymer, and an inorganic frame containing compound such as alkylsiloxane are radically copolymerized, or an inorganic functional group such as alkoxy silane is bound to an organic polymer as a pendent group, and then the organic polymer is crosslinked.

Japanese Patent Kokai Publication No. 57642/1988, 103486/1991, and J. Appl. Polym. Sci., vol. 35, pages 2039 to 2051, 1988, for example disclose the process for preparing an organic-inorganic hybrid polymer material in which an organic monomer or an organic polymer is radically polymerized by using an alkyl siloxane-containing compound as an initiator. However, it is even difficult to introduce an alkyl siloxane moiety to the both end of the organic monomer or the organic polymer, and it is impossible to introduce a siloxane frame uniformly into the structure of the resulting polymer, by the abovedescribed process in which an alkyl siloxane-containing compound is used as an initiator. At present, the synthesis of the alkyl siloxane-containing compound also requires complicated procedures.

Macromolecules, vol. 24, No. 6, page 1431, 1991, describes the method for preparing a siloxane-containing polymer by the anionic polymerization method. However, in order to obtain the intended polymer material, the reaction conditions must be carefully controlled because the reactivity and the physical property of the employed material are different from each other.

Additionally, the anionic polymerization is high in cost, and it is not practical to conduct the above described process under the industrial scale.

Japanese Patent Kokai Publication No. 43679/1993, and 86188/1993 describe the process for preparing an organic-inorganic hybrid polymer material in which a vinyl polymer and a silicone compound having a silane group (Si—H group) are subjected to the hydrosilylation reaction, and then the resultant are crosslinked by the sol-gel method.

Japanese Patent Kokai Publication No. 104710/1996, and 104711/1996 describe the process for preparing an organic-inorganic hybrid polymer material in which a vinyl monomer is radically polymerized using an alkoxysilyl group-end capped azoic initiator, and the resulting alkoxysilyl group-end capped vinyl polymer is hydrolyzed and polycondensed. There is described here polystyrene, polyvinyl chloride, an acrylic resin as the vinyl polymer.

The vinyl polymers however are poor in heat resistance and mechanical strength, and are not suitable for employing as a high-performance plastic material, particularly as a structural material and a hard coating material.

Macromolecules, vol. 25, page 4309, 1992, discloses the process for preparing an organic-inorganic hybrid polymer material in which an alkoxysilyl group is bonded to a main chain of a polyalkylene oxide polymer, and the resultant is hydrolyzed and polycondensed. As the main chain of the organic-inorganic hybrid polymer material, Macromol. Chem. Macromol. Symp., vol. 42/43, page 303, 1991, discloses a polyoxazoline polymer, J. Inorg. Organomet. Polym., vol. 5, No. 4, pages 343 to 375, 1995, discloses a polyamine polymer, and J. Appl. Polym. Sci., vol. 58, page 1263, 1995, discloses a cellulose polymer.

However, all the polymers described above as the main chain of the organic-inorganic hybrid polymer material, are hydrophilic. The hydrophilic polymers are hygroscopic, poor in water resistance, and are not suitable for employing as a plastic molded material, a sealing material, a coating raw material, a structural material, a hard coating material, and the like.

On the other hand, hydrophobic polymers, particularly engineering plastics are excellent in heat resistance, mechanical strength, and water resistance. Hydrophobic polymers are widely demanded and employed as an industrial plastic material. The development of an organic-inorganic hybrid polymer material using a hydrophobic polymer is therefore generally required.

However, hybridization by using a hydrophobic polymer is generally difficult because a hydrophobic polymer is not soluble or hardly soluble into an alcoholic solvent which is usually employed as a solvent for the sol-gel reaction, and the number of reactive functional group in a hydrophobic polymer is generally poor. Therefore, there is no reference which describes the organic-inorganic hybrid polymer material using the hydrophobic polymer.

The hydrophobic polymer generally has a small number of functional group therein as described above. The hydrophobic polymer often has only two functional groups at the terminal ends. As a result, the content of an inorganic moiety of the resulting organic-inorganic hybrid polymer material is up to few % by weight. Such a minor content of the inorganic moiety is not sufficient to improve physical strength of the organic-inorganic hybrid polymer material such as heat resistance, hardness, and the like.

In the process of the sol-gel method, a porous gel is formed by subjecting a raw material such as metal alkoxide to hydrolysis and polycondensation. The porous gel has recently been employed as a catalyst. It is otherwise used as glass or ceramics after that the pores thereof is stopped by sintering at high temperature (e.g., Sumio SAKUKA et al., "Science of sol-gel method").

Glass is well-known as a material having excellent gas-barrier ability, and is commonly used as a container for sealing. However, the glass has a drawback of heavy and easy to break.

On the other hand, polycarbonate is a material which has relatively poor gas-barrier ability among the engineering plastics. Therefore, the polycarbonate heretofore has not been commonly used as a container for sealing even though it has excellent impact resistance and transparency.

That is, if the glass and the polycarbonate are combined and the drawbacks thereof are complemented and the advantages thereof are exploited, the resulting material will have excellent properties, and it must be used as an alternate of a glass container or a glass material.

SUMMARY OF THE INVENTION

According to the present invention, the organic-inorganic hybrid polymer materials are provided, which have both the characteristics of an inorganic material such as heat resistance, weather resistance, surface hardness, rigidity, water resistance, chemical resistance, pollution resistance, mechanical strength, flame resistance, and the like, and the characteristics of an organic material such as impact resistance, softness, easy-processing, and the like.

By first, the present invention provides an organic-inorganic hybrid polymer material obtained by the process in which a polymer having a polycarbonate and/or a polyarylate moiety as a main frame and having a metal alkoxide group as a functional group, is hydrolyzed and polycondensed to form crosslinkages.

The first preferred aspect of the present invention is the process for preparing an organic-inorganic hybrid polymer material in which polymer (A) having at least one functional group in the molecule and a polycarbonate and/or a polyarylate moiety as a main frame, and metal alkoxide (B) having a functional group which may react with the functional group of polymer (A), are reacted to obtain polymer (C) having a metal alkoxide group as a functional group in the molecule, then the resulting polymer (C) is hydrolyzed and polycondensed to form an organic-inorganic hybrid polymer material having three-dimensional crosslinkages by the sol-gel method.

According to the first aspect of the present invention, an organic-inorganic hybrid polymer material using a hydrophobic polymer is prepared. The organic-inorganic hybrid polymer material is excellent in heat resistance, mechanical strength, and water resistance. The organic-inorganic hybrid polymer material is therefore preferred to be employed as an industrial material, particularly a plastic molded material, a plastic film material, a sealing material, a raw material for adhesive or coating, a structural material, an optical material, a polymeric silane coupling agent, a resin additive, a surface modifying agent, a hard coating material, and the like.

Secondary, the present invention provides an organic-inorganic hybrid polymer material obtained by the process in which a polymer having a polycarbonate and/or a polyarylate moiety as a main frame and having a metal alkoxide group as a functional group, and a metal alkoxide compound are cohydrorized and copolycondensed to form crosslinkages.

The second preferred aspect of the present invention is the process for preparing an organic-inorganic hybrid polymer material in which polymer (C) having at least one metal alkoxide group in the molecule and a polycarbonate and/or a polyarylate moiety as a main frame, and metal alkoxide (B) are mixed and dispersed finely and uniformly, and the mixture is hydrolyzed and polycondensed to form an organic-inorganic hybrid polymer material having three-dimensional crosslinkages by the sol-gel method.

According to the second aspect of the present invention, an organic-inorganic hybrid polymer material having a hydrophobic polymer as a main frame and an enlarged inorganic moiety content, is prepared. The organic-inorganic hybrid polymer material is particularly excellent in heat resistance, mechanical strength, surface hardness, gas-barrier ability, water resistance, and transparency. The organic-inorganic hybrid polymer material is therefore preferred to be employed as a high performance and a high functional plastic material.

DETAILED DESCRIPTION OF THE INVENTION

Polymer (A)

Polymer (A) of the present invention is the polymer which has at least one functional group in the molecule and has a polycarbonate and/or a polyarylate moiety as a main frame. Preferred examples of polymer (A) include polycarbonate, polyester carbonate, and polyarylate, and the like.

Polymer (A) may be a homopolymer or a copolymer of plural monomers. Polymer (A) may be a mixture of plural polymers, and it may be linear or branched. Polymer (A) is preferably soluble in a solvent such as hydrocarbon, halogenated hydrocarbon, and ether, and has a number average molecular weight of from 500 to 50000, more preferably 1000 to 10000.

Polymer (A) have to have at least one, preferably not less than two functional groups in the molecule. The functional group have to be able to react with a functional group of metal alkoxide (B), but a class of them is not particularly limited.

Specific examples of the functional group include a hydroxyl group, an amino group, a carboxyl group, a thiol group, an alkenyl group, an alkynyl group, an acid halide group, an acid ester group, a formyl group, a halogen atom, an epoxy group, and an isocyanato group. Preferred are those having an active hydrogen atom, such as a hydroxyl group, an amino group, and a carboxyl group. The functional group equivalent weight of the polymer (A) is generally 1 to 50, preferably 2 to 10.

Metal alkoxide (B)

Metal alkoxide (B) of the present invention is not limited to, and any class of them may be used. Examples of metal alkoxide (B) preferably to be used in the present invention are those represented by the formula (1):

$$A_pM \quad (1)$$

wherein A represents an alkoxy group having 1 to 8, preferably 1 to 4 carbon atoms;

M represents a metal element selected from the group consisting of Si, Ti, Zr, Fe, Cu, Sn, B, Al, Ge, Ce, Ta, and W, preferably the group consisting of Si, Ti, and Zr; and p represents an integer of 2 to 6.

Specific examples of metal alkoxide (B) include tetraalkoxysilanes such as tetramethoxysilane, tetraethoxysilane, tetraisopropoxysilane, and tetrabutoxysilane;

titanium tetra-alkoxides such as titanium tetra-n-propoxide, titanium tetra-iso-propoxide, and titanium tetrabutoxide;

zirconium tetra-alkoxides such as zirconium tetra-n-propoxide, zirconium tetra-iso-propoxide, and zirconium tetrabutoxide; and metal alkoxides such as copper dimethoxide, barium diethoxide, boron trimethoxide, gallium triethoxide, aluminium tributoxide, germanium tetraethoxide, lead tetrabutoxide, tantalum penta-n-propoxide, and tungsten hexaethoxide.

Particularly preferred metal alkoxide (B) to be used in the present invention is those represented by the formula (1) in which M represents Si because silicone alkoxide is easy to apply for general purpose.

The other examples of metal alkoxide (B) are those represented by the formula (2):

$$R_k A_l M(R'_m X)_n$$

wherein R represents a phenyl group or an alkyl group having 1 to 8, preferably 1 to 4 carbon atoms, A represents an alkoxy group having 1 to 8, preferably 1 to 4 carbon atoms, M represents a metal element selected from the group consisting of Si, Ti, Zr, Fe, Cu, Sn, B, Al, Ge, Ce, Ta, and W, preferably the group consisting of Si, Ti, and Zr, R' represents an alkylene group or an alkylidene group having 1 to 4, preferably 2 to 4 carbon atoms, X represents a functional group selected from the group consisting of an isocyanato group, an epoxy group, a carboxyl group, an acid halide group, an acid anhydride group, an amino group, a thiol group, a vinyl group, a methacryl group, and a halogen atom, and k represents an integer of 0 to 5, l represents an integer of 1 to 5, m represents 0 or 1, n represents an integer of 0 to 5.

Specific examples of metal alkoxide (B) of which metal is silicone, include (alkyl)alkoxysilanes such as trimethoxysilane, triethoxysilane, tri-n-propoxysilane, dimethoxysilane, diethoxysilane, di-iso-propoxysilane, monomethoxysilane, monoethoxysilane, monobutoxysilane, methyldimethoxysilane, ethyldiethoxysilane, dimethylmethoxysilane, di-iso-propylisopropoxysilane, methyltrimethoxysilane, ethyltriethoxysilane, n-propyltri-n-propoxysilane, butyltributoxysilane, dimethyldimethoxysilane, diethyldiethoxysilane, di-isopropyldi-iso-propoxysilane, dibutyldibutoxysilane, trimethylmethoxysilane, triethylethoxysilane, tri-n-propyl-n-propoxysilane, tributylbutoxysilane, phenyltrimethoxysilane, diphenyldiethoxysilane, and triphenylmethoxysilane;

(alkyl)alkoxysilanes having an isocyanato group such as 3-isocyanatopropyltrimethoxysilane, 3-isocyanatopropyltriethoxysilane, 2-isocyanatoethyltriethoxysilane, 2-isocyanato-ethyltri-n-propoxysilane, 2-isocyanato-ethylethyldibutoxysilane, 3-isocyanatopropylmethyldimethoxysilane, 3-isocyanatopropylethyldiethoxysilane, 3-isocyanatopropyldimethyl-iso-propoxysilane, 3-isocyanatopropyldiethylethoxysilane, 2-isocyanatoethyldiethylbutoxysilane, di(3-isocyanatopropyl)diethoxysilane, di(3-isocyanatopropyl)methylethoxysilane, and ethoxytri-isocyanatosilane;

(alkyl)alkoxysilanes having an epoxy group such as 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxypropyldimethylethoxysilane, 2-(3,4-epoxycyclohexyl)ethyltrimethoxysilane, and 3,4-epoxybutyltrimethoxysilane;

(alkyl)alkoxysilanes having a carboxyl group such as carboxymethyltriethoxysilane, carboxymethylethyldiethoxysilane, and carboxyethyldimethylmethoxysilane;

alkoxysilanes having an acid anhydride group such as 3-(triethoxysilyl)-2-methylpropylsuccinic anhydride;

alkoxysilanes having a acid halide group such as 2-(4-chlorosulfonylphenyl)ethyltriethoxysilane;

(alkyl)alkoxysilanes having an amino group such as 3-aminopropyltrimethoxysilane, 3-aminopropyltriethoxysilane, N-2-(aminoethyl)-3-aminopropyltriethoxysilane, N-2-(aminoethyl)-3-aminopropylmethyldimethoxysilane, and N-phenyl-3-aminopropyltrimethoxysilane;

(alkyl)alkoxysilanes having a thiol group such as 3-mercaptopropyltrimethoxysilane, 3-mercaptopropyltriethoxysilane, 2-mercaptoethyltriethoxysilane, and 3-mercaptopropylmethyldimethoxysilane;

(alkyl)alkoxysilanes having a vinyl group such as vinyltrimethoxysilane, vinyltriethoxysilane, and vinylmethyldiethoxysilane;

(alkyl)alkoxysilanes having a methacryl group such as 3-methacryloxypropyltrimethoxysilane, 3-methacryloxypropyltriethoxysilane, and 3-methacryloxypropylmethyldimethylsilane;

(alkyl)alkoxysilanes having a halogen atom such as triethoxyfluorosilane, 3-chloropropyltrimethoxysilane, 3-bromopropyltriethoxysilane, and 2-chloroethylmethyldimethoxysilane; and alkylalkoxysilanes employing an alkoxy group as a functional group such as isopropyltri-isopropoxysilane, and tri-isopropylisopropoxysilane.

Substantially the same compounds as described above except that the metal element other than silicon, for example Ti, Zr, Fe, Cu, Sn, B, Al, Ge, Ce, Ta, or W is used, are also included in the scope of metal alkoxide (B) of the present invention.

Specific examples of such compounds include monoisocyanatotrialkoxymetals such as 2-isocyanatoethyltripropoxyzirconium, and 2-isocyanatoethyltributoxytin;

monoisocyanatodialkoxymetals such as 3-isocyanatopropylmethyldi-isopropoxytitane, 2-isocyanatoethylethyldipropoxyzirconium, 2-isocyanatoethylmethyldibutoxytin, and isocyanatomethyldimethoxyaluminium;

monoisocyanatomonoalkoxymetals such as 3-isocyanatopropyldimethylisopropoxytitane, 2-isocyanatoethyldiethylpropoxyzirconium, 2-isocyanatoethyldimethylbutoxytin, and isocyanatomethylmethylmethoxyaluminium;

metal alkoxides employing an epoxy group as a functional group such as 3-glycidoxypropyltriisopropoxytitane, 3-glycidoxypropylmethyldi-isopropoxytitane, 3-glycidoxypropyldimethylisopropoxytitane, 3,4-epoxybutyltripropoxyzirconium, 3,4- epoxybutylmethyldipropoxyzirconium, 3,4-epoxybutyldimethylpropoxyzirconium, and β-(3,4-epoxycyclohexyl)ethyltriethoxytin.

Metal alkoxide (B) may be used alone or in combination of not less than two thereof. The metal alkoxide compound which includes not less than two kinds of metal such as Mg[Al(iso-OC$_3$H$_7$)$_4$]$_2$, Ba[Zr$_2$(OC$_2$H$_5$)$_9$]$_2$, (C$_3$H$_7$O)$_2$Zr[Al(OC$_3$H$_7$)$_4$]$_2$, or the oligomer type metal alkoxide compound which includes not less than two repeating unites in the molecule such as tetramethoxysilane oligomer, tetraethoxysilane oligomer are also employed. The alkoxy group of metal alkoxide (B) may be an acetoxy group.

Polymer (C)

Polymer (C) of the present invention is the polymer which has at least one metal alkoxide group in the molecule and has a polycarbonate and/or a polyarylate moiety as a main frame. Polymer (A) and metal alkoxide (B) of the present invention are reacted by the conventional process optionally in the presence of catalyst to obtain polymer (C).

In case that a functional group of metal alkoxide (B) is an isocyanato group, or an acid halide group, and a functional group of polymer (A) is a hydroxyl group, an amino group, a carboxyl group, or a thiol group, an organic base compound such as 1,4-diazabicyclo[2,2,2]octane (DABCO), 1,8-diazabicyclo[5,4,0]-7-undecene (DBU), triethylamine, tributylamine, piperidine, or the like is generally employed as the catalyst.

In case that a functional group of metal alkoxide (B) is an epoxy group, and a functional group of polymer (A) is a hydroxyl group, an amino group, a carboxyl group, or a thiol group, an acid compound such as hydrochloric acid, sulfuric acid, nitric acid, acetic acid, or the like is generally employed as the catalyst.

In case that a functional group of metal alkoxide (B) is a carboxyl group, an acid anhydride group, or an alkoxy group, and a functional group of polymer (A) is a hydroxyl group, an amino group, a carboxyl group, or a thiol group, both the base compound and the acid compound may be employed as the catalyst.

In case that a functional group of polymer (A) is an alkenyl group or an alkynyl group, polymer (A) and a silicone compound having a silane group (Si—H group) are subjected to the hydrosilylation reaction to obtain polymer (C) in which an alkoxysilyl group is introduced.

Specific examples of the reaction process between metal alkoxide (B) and polymer (A) are described below.

In the first method, polymer (A) which has a functional group comprising an active hydrogen such as a hydroxyl group, an amino group, a carboxyl group, a thiol group or the like, is allowed to react with metal alkoxide (B) which has a functional group such as an isocyanato group, an epoxy group, a carboxyl group, an acid halide group, an acid anhydride group or the like, in a solvent, preferably under an inert gas atmosphere. The solvent employed may be those which can dissolve both polymer (A) and metal alkoxide (B).

The reaction is generally conducted by adding metal alkoxide (B) or a solution thereof to a solution of polymer (A), followed by stirring the resultant at room temperature or with slightly heating. It is preferable that the equivalent weight ratio of a functional group contained in metal alkoxide (B) based on polymer (A) is 1/10 to 10.

After the end of the reaction, the sol-gel reaction may subsequently be conducted by using the resulting reaction mixture. Otherwise, the reaction mixture is evaporated or poured into a less-soluble solvent to precipitate a reaction product, the reaction product is washed, purified, and dried, and then the sol-gel reaction is conducted by using the reaction product.

In the second method, polymer (A) which has a functional group comprising an active hydrogen is allowed to react with metal alkoxide (B) which is tetra-alkoxymetal or trialkoxymetal, in a solvent, preferably under an inert gas atmosphere. A functional group in polymer (A) preferably bonds to an aliphatic chain of polymer (A), and the carbon number of an alkoxide group in metal alkoxide (b) is preferably as small as possible, in order to conduct the reaction advantageously.

The solvent employed have to be those which can dissolve both polymer (A) and metal alkoxide (B). The reaction without water is preferred, and a non-polar solvent or a dehydrated solvent is preferably employed. It is preferable that the reaction is conducted in the presence of a catalyst in the catalytic amount. Examples of the catalyst include an acidic catalyst such as hydrochloric acid, sulfonic acid, and acetic acid; a basic catalyst such as triethylamine, DBU, and piperidine; and a metallic catalyst such as ferric chloride, ferrous chloride, and zinc chloride.

It is preferable that the equivalent weight ratio of a functional group contained in metal alkoxide (B) based on that of polymer (A) is 1/4 to 100.

After the end of the reaction, the sol-gel reaction may subsequently be conducted by using the resulting reaction mixture. Otherwise, the reaction mixture is evaporated or poured into a less-soluble solvent to precipitate a reaction product, the reaction product is washed, purified, and dried, and then the sol-gel reaction is conducted by using the reaction product.

In the third process, polymer (A) having a functional group such as an alkenyl group and an alkynyl group, and metal alkoxide (B) which is a silicone compound having a Si—H group are subjected to the hydrosilylation reaction.

The hydrosilylation reaction is preferred to be conducted in a solvent in the presence of a catalyst. Examples of the catalyst generally include a transition metal complex such as chloroplatinic acid, 1,.3-divinyl-1,1,3,3-tetramethyldisiloxaneplatinum complex, and tris (triphenylphosphine)rhodium chloride.

Examples of the solvent employed for the sol-gel reaction include a hydrocarbon solvent such as benzene, toluene, xylene, ethyl benzene, and n-hexane; a halogenated hydrocarbon solvent such as carbon tetrachloride, chloroform, dichloromethane, chloroethane, dichloroethane, chlorobenzene, dichlorobenzene, and trichlorobenzene; an ether solvent such as tetrahydrofuran, 1,4-dioxane, 1,3-dioxane, diethyl ether, and dibutyl ether; a ketone solvent such as acetone, methyl ethyl ketone, methyl isobutyl ketone, and cyclohexanone, but is not limited to these examples.

A main frame of polymer (C) prepared as described above, may be composed of any one of polycarbonate, polyester carbonate, or polyarylate, or copolymer thereof. A main frame of polymer (C) may be composed of a mixture of the plural polymers, and it may be linear or branched. Polymer (C) is preferably soluble in a solvent such as hydrocarbon, halogenated hydrocarbon, and ether, and has a number average molecular weight of from 500 to 50000, more preferably 1000 to 15000.

A metal alkoxide group of polymer (C) has a central metal element selected from the group consisting of Si, Ti, Zr, Fe, Cu, Sn, B, Al, Ge, Ce, Ta, and W, preferably the group consisting of Si, Ti, and Zr; and 1 to 5 alkoxide group having 1 to 8, preferably 1 to 4 carbon atoms. Particularly preferred central metal element is Si because silicone alkoxide is easy to apply for general purpose.

The metal alkoxide group equivalent weight of polymer (C) is 1 to 100, preferably 1 to 50, more preferably 2 to 10. If the the metal alkoxide group equivalent weight of polymer (C) is less than 1, performance of the resulting material may become poor, and if more than 100, the resulting material may become breakable.

The plural metal alkoxide groups present in polymer (C) may be the same or different. The metal alkoxide groups may be those which include not less than two kinds of metal, or the oligomer type metal alkoxide group which includes not less than two repeating unites.

Organic-inorganic Hybrid Polymer Material (1)

In the first embodiment of the present invention, polymer (C) having a polycarbonate and/or a polyarylate moiety as a main frame and having a metal alkoxide group as a functional group is hydrolyzed and polycondensed by the sol-gel reaction. The polymer (C) may be dissolved in the reaction mixture right after preparation, or be isolated.

Throughout the specification, the hydrolysis and polycondensation by the sol-gel process means the reaction process in which a polymer having a metal alkoxide group reacts with water, the metal alkoxide group converts to a hydroxyl group, and the hydroxyl group is simultaneously polycondensed with an adjacent hydoxymetal group (e.g., —Si(OH)$_3$) or an adjacent alkoxymetal group by dehydration or dealcoholation to form three-dimensional crosslinkages composed of inorganic covalent bond.

The water may be added to the reaction process in the amount sufficient for converting all of the alkoxy group to the hydroxyl group. Otherwise, water present in the reaction mixture, or moisture of an atmosphere may be utilized. The reaction is preferably conducted at from room temperature to 100° C. for 0.5 to 24 hours. An acidic catalyst such as hydrochloric acid, sulfonic acid, acetic acid, benzenesulfonic acid, and p-toluenesulfonic acid, or a basic catalyst such as sodium hydroxide, potassium hydroxide, ammonia, triethylamine, piperidine, and DBU, may also be employed.

After the end of the reaction, the resulting material may further be heated at 50 to 400° C., for 5 minutes to 48 hours in order to surely proceed the polycondensation reaction and to form hard crosslinkages.

The metal selected from the group consisting of Si, Ti, Zr, Fe, Cu, Sn, B, Al, Ge, Ce, Ta, and W, and a metal compound thereof such as metal oxide, metal complex, metal salt, and the like may further be employed in the hydrolysis and polycondensation reaction of the present invention, in view of further improving strength, hardness, weather resistance, chemical resistance, flame resistance, static resistance of the resulting material; for newly supplying the performance to the material; or for controlling the inorganic content or the crosslinking density of the material.

An anti-drying agent such as formamide, dimethylformamide, dioxane, oxalic acid, or the other additives such as acetyl acetone, and the like may be included in the reaction mixture for the hydrolysis and polycondensation reaction of the present invention for preventing from forming the clack during the drying process.

Organic-inorganic Hybrid Polymer Material (2)

In the second embodiment of the present invention, polymer (C) having a polycarbonate and/or a polyarylate moiety as a main frame and having a metal alkoxide group as a functional group, and metal alkoxide (B) are cohydrolyzed and copolycondensed by the sol-gel reaction.

The ratio of the polymer (C) and metal alkoxide (B) may optionally be varied. The weight ratio of the polymer (C) and metal alkoxide (B) is generally 10:90 to 90:10.

The hydrolysis and polycondensation of the second embodiment of the present invention may be conducted by the procedure in which polymer (C) and metal alkoxide (B) are mixed and dissolved in a solvent beforehand, and then the resulting mixture is subjected to the sol-gel reaction, or that in which either polymer (C) or metal alkoxide (B) is hydrolyzed beforehand, then another is added, and the resulting mixture is subjected to the sol-gel reaction.

The organic-inorganic hybrid polymer material prepared by the procedure has the structure in which the two components are dispersed and bonded finely and uniformly, improving its heat resistance and mechanical strength.

Metal alkoxide (B) is preferably used in an amount of not less than 10% by weight in order to obtain the plastic material which has improved its heat resistance by comparison with the conventional engineering plastics such as polycarbonate. Metal alkoxide (B) is preferably used in an amount of not less than 10% by weight, more preferably not less than 50% by weight in order to obtain the plastic material which has improved surface hardness by comparison with the conventional engineering plastics.

Further, the organic-inorganic hybrid polymer material of the second embodiment shows very excellent gas-barrier ability by comparison with the conventional film material such as polyethylene, polypropylene, and polystyrene. The weight ratio of polymer (C) and metal alkoxide (B) should be 1:9 to 9:1, preferably 1:9 to 5:5 in order to prepare a gas-barrier film by using the organic-inorganic hybrid polymer material of the second embodiment.

EXAMPLES

The present invention is illustrated by the following examples which, however, are not to be construed as limiting the present invention to their details.

Example 1

Alkoxysilylation of Polycarbonate diol

Polycarbonate diol (PC-diol) having a number average molecular weight of 3900 was prepared according to the process known to the art (for example Japanese Patent Kokoku Publication No. 33441/1995). The PC-diol (70.00 g) was dissolved into 500 mL of chloroform. To the solution was added 13.32 g of 3-isocyanatopropyltriethoxysilane (IPTES), heated with refluxing for 10 hours, and cooled to room temperature. The reaction mixture was dropwise added to 7 L of methanol to precipitate the reaction product. The precipitated substance was filtered off, washed with methanol, and dried in vacuo (97.0% yield).

Figure 1:
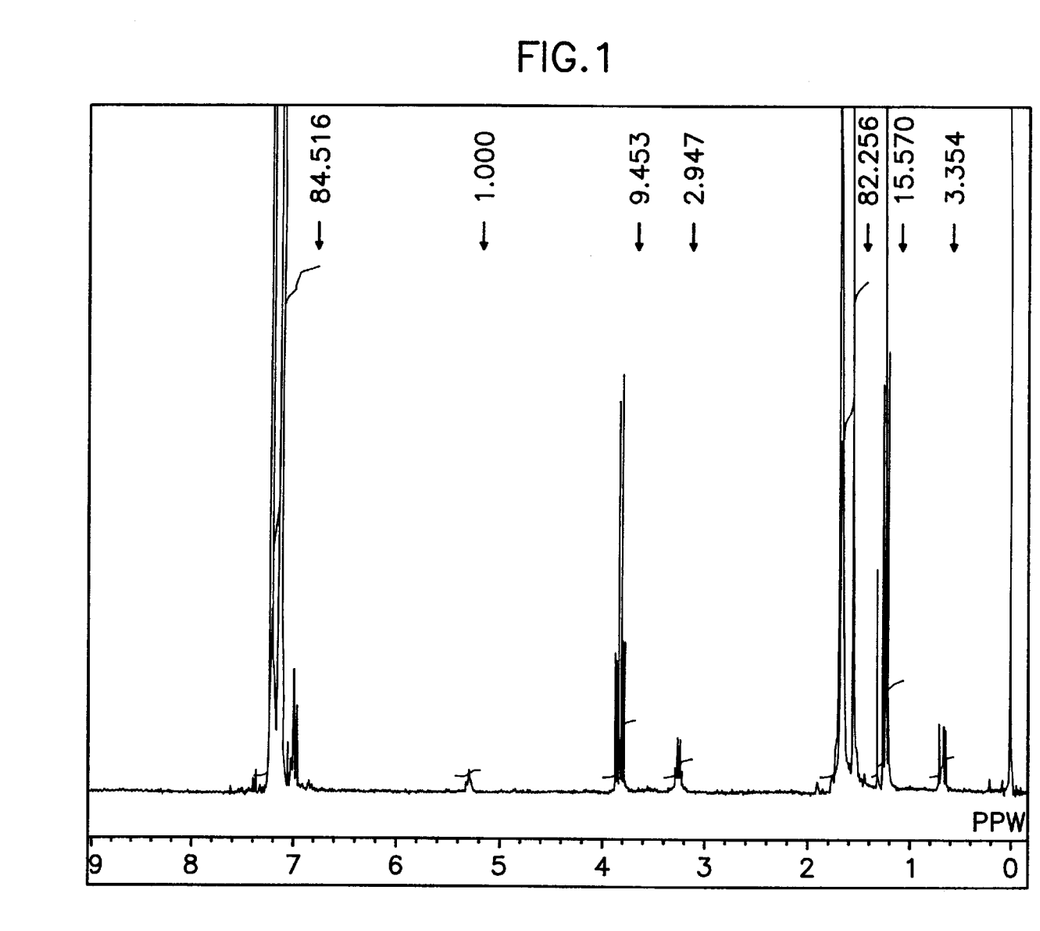
FIG. 1 shows a $^1$H-NMR spectrum of the alkoxysilylated polycarbonate prepared in Example 1.

$^1$H-NMR spectrum of the resulting reaction product is shown in FIG. 1. The spectrum showed that the reaction product was alkoxysilylated polycarbonate in which an alkoxysilyl group is introduced at the both ends of the polycarbonate (PCS). The number average molecular weight of the reaction product was determined to be 4400 by GPC measurement.

Example 2

Alkoxysilylation of PC-diol

PC-diol having a number average molecular weight of 6600 was prepared according to the process known to the art (for example Japanese Patent Kokoku Publication No. 33441/1995). The PC-diol (70.00 g) was dissolved into 500 mL of chloroform. To the solution was added 7.87 g of IPTES, heated with refluxing for 15 hours, and cooled to room temperature. The reaction mixture was treated as described in Example 1 to obtain a reaction product (99.3% yield).

$^1$H-NMR spectrum of the reaction product showed that an alkoxysilyl group was present at the both ends of the reaction product. The number average molecular weight of the reaction product was determined to be 7500 by GPC measurement.

Example 3

Alkoxysilylation of PC-diol

PC-diol having a number average molecular weight of 8600 was prepared according to the process known to the art (for example Japanese Patent Kokoku Publication No. 33441/1995). The PC-diol (70.00 g) was dissolved into 500 mL of chloroform. To the solution was added 6.04 g of IPTES, heated with refluxing for 15 hours, and cooled to room temperature. The reaction mixture was treated as described in Example 1 to obtain a reaction product (99.1% yield).

$^1$H-NMR spectrum of the reaction product showed that an alkoxysilyl group was present at the both ends of the reaction product. The number average molecular weight of the reaction product was determined to be 9000 by GPC measurement.

Example 4

Alkoxysilylation of PC-diol

PC-diol having a number average molecular weight of 3400 was prepared according to the process known to the art (for example Japanese Patent Kokoku Publication No. 33441/1995). The PC-diol (3.00 g) was dissolved into 30 mL of toluene. To the solution was added 0.65 g of IPTES, and heated with refluxing for 8 hours. The reaction mixture was dropwise added to 500 mL of methanol to precipitate the reaction product. The precipitated substance was filtered off, washed with methanol, and dried in vacuo (88.9% yield).

$^1$H-NMR spectrum of the reaction product showed that an alkoxysilyl group was present at the both ends of the reaction product. The number average molecular weight of the reaction product was determined to be 4300 by GPC measurement.

Example 5

Alkoxysilylation of PC-diol

The reaction product was obtained according to substantially the same manner as described in Example 4, except that 1,2,4-trichlorobenzene was employed as a reaction solvent instead of toluene (91.9% yield).

$^1$H-NMR spectrum of the reaction product showed that an alkoxysilyl group was present at the both ends of the reaction product. The number average molecular weight of the reaction product was determined to be 4200 by GPC measurement.

Example 6

Alkoxysilylation of PC-diol

PC-diol having a number average molecular weight of 3400 was prepared according to the process known to the art (for example Japanese Patent Kokoku Publication No. 33441/1995). The PC-diol (3.00 g) was dissolved into 30 g of chloroform. To the solution was added 0.65 g of β-(3,4-epoxycyclohexyl)ethyltrimethoxysilane and a minor amount of acetic acid, heated with refluxing for 8 hours, and cooled to room temperature. The reaction mixture was treated as described in Example 4 to obtain a reaction product (88.8% yield).

$^1$H-NMR spectrum of the reaction product showed that an alkoxysilyl group was present at the both ends of the reaction product. The number average molecular weight of the reaction product was determined to be 4200 by GPC measurement.

Example 7

Alkoxysilylation of PC-diol

PC-diol having a number average molecular weight of 3400 was prepared according to the process known to the art (for example Japanese Patent Kokoku Publication No. 33441/1995). The PC-diol (3.00 g) was dissolved into 30 g of chloroform. To the solution was added 0.74 g of γ-glycidoxypropyltriethoxysilane, and a minor amount of acetic acid, heated with refluxing for 8 hours, and cooled to room temperature. The reaction mixture was treated as described in Example 4 to obtain a reaction product (92.0% yield).

$^1$H-NMR spectrum of the reaction product showed that an alkoxysilyl group was present at the both ends of the reaction product. The number average molecular weight of the reaction product was determined to be 4200 by GPC measurement.

Example 8

Alkoxysilylation of PC-diol

PC-diol having a number average molecular weight of 3400 was prepared according to the process known to the art (for example Japanese Patent Kokoku Publication No. 33441/1995). The PC-diol (5.00 g) was dissolved into 100 g of dimethylformamide. To the solution was added 4.6 g sodium carbonate, and 0.53 g of allyl bromide, heated at 75° for 10 hours, and cooled to room temperature. The reaction mixture was dropwise added to 1 L of methanol to precipitate the reaction product. The precipitated substance was filtered off, washed with methanol, and dried in vacuo to obtain the polycarbonate having an allyl group at the both ends (85% yield).

The polycarbonate having an allyl group at the both ends (3.00 g) was dissolved into 60 g of tetrahydrofuran (THF). To the solution was added a minor amount of chloroplatinic acid, and 0.42 g of triethoxysilane, heated with refluxing for 5 hours, and cooled to room temperature. The reaction mixture was dropwise added to 600 mL of methanol to precipitate the reaction product. The precipitated substance was filtered off, washed with methanol, and dried in vacuo (82% yield).

$^1$H-NMR spectrum of the reaction product showed that an alkoxysilyl group was present at the both ends of the reaction product. The number average molecular weight of the reaction product was determined to be 3900 by GPC measurement.

Example 9

Film Preparation by Sol-Gel Method

The alkoxysilylated polycarbonate (4.62 g) having a number average molecular weight of 4400 prepared in Example 1 was dissolved into 46 g of THF. To the solution was added 0.34 g of 1N aqueous hydrochloric acid, and vigorously stirred at room temperature for 1 hour to conduct hydrolysis.

The resulting solution was coated on a polyamide substrate at a thickness of 18.5 μm by using a spin coater. The solution was separately casted in a stainless dish covered with Teflon, a solvent was allowed to evaporate, and the residue was heated at 150° C. to obtain a transparent and suitable PCS film.

Hardness, viscoelasticity, and tensile strength of the PCS film were tested. The results were shown in Table 1.

Example 10

Film Preparation by Sol-Gel Method

The alkoxysilylated polycarbonate (4.62 g) having a number average molecular weight of 7500 prepared in Example 2 was dissolved into 46 g of THF. To the solution was added 0.20 g of 1N aqueous hydrochloric acid, and treated as described in Example 9 to obtain a transparent and suitable PCS film.

Hardness, viscoelasticity, and tensile strength of the PCS film were tested. The results were shown in Table 1.

Example 11

Film Preparation by Sol-Gel Method

The alkoxysilylated polycarbonate (4.62 g) having a number average molecular weight of 9000 prepared in Example 3 was dissolved into 46 g of THF. To the solution was added 0.16 g of 1N aqueous hydrochloric acid, and treated as described in Example 9 to obtain a translucent and suitable PCS film.

Hardness, viscoelasticity, and tensile strength of the PCS film were tested. The results were shown in Table 1.

Example 12

Film Preparation by Sol-Gel Method

The alkoxysilylated polycarbonate (4.62 g) having a number average molecular weight of 5900 was dissolved into 46 g of THF. To the solution was added 0.24 g of 1N aqueous hydrochloric acid, and treated as described in Example 9 except that the coated film was heated at 160° C., to obtain a transparent and suitable PCS film.

Hardness, viscoelasticity, and tensile strength of the PCS film were tested. The results were shown in Table 1.

Example 13

Film Preparation by Sol-Gel Method

The alkoxysilylated polycarbonate (4.62 g) having a number average molecular weight of 7200 was dissolved into 46 g of THF. To the solution was added 0.20 g of 1N aqueous hydrochloric acid, and treated as described in Example 9 except that the coated film was heated at 160° C., to obtain a transparent and suitable PCS film.

Hardness, viscoelasticity, and tensile strength of the PCS film were tested. The results were shown in Table 1.

Example 14

Film Preparation by Sol-Gel Method

The alkoxysilylated polycarbonate (4.62 g) having a number average molecular weight of 9400 was dissolved into 46 g of THF. To the solution was added 0.16 g of 1N aqueous hydrochloric acid, and treated as described in Example 9 except that the coated film was heated at 160° C., to obtain a translucent and suitable PCS film.

Hardness, viscoelasticity, and tensile strength of the PCS film were tested. The results were shown in Table 1. The characteristic curves obtained by the dynamic mechanical analytic measurement were shown in FIG. 2.

Comparative Example 1

A polycarbonate resin (4.62 g) having a number average molecular weight of 36000, commercially available as the trade name of "IUPILON" from Mitsubishi Engineering Plastics K.K., was dissolved into 100 g of dichloromethane. The resulting solution was coated on a polyamide substrate at a thickness of 7.7 μm by using a spin coater. The solution was separately casted in a stainless dish covered with Teflon, a solvent was allowed to evaporate, and the residue was heated at 120° C. to obtain a transparent polycarbonate (PC) film.

Figure 2:
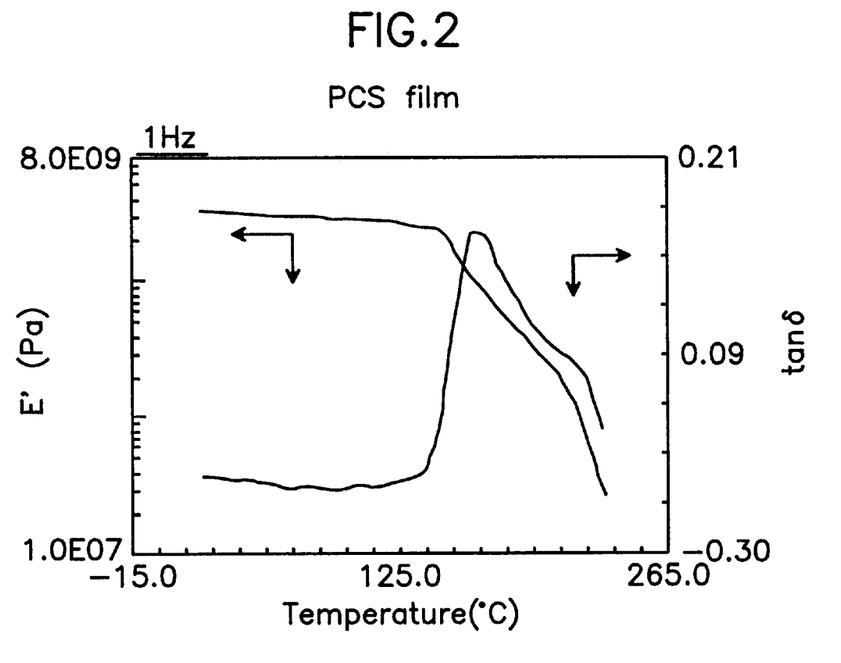
FIG. 2 shows a characteristic curve obtained by the dynamic mechanical analysis of the PCS film prepared in Example 14.
Figure 3:
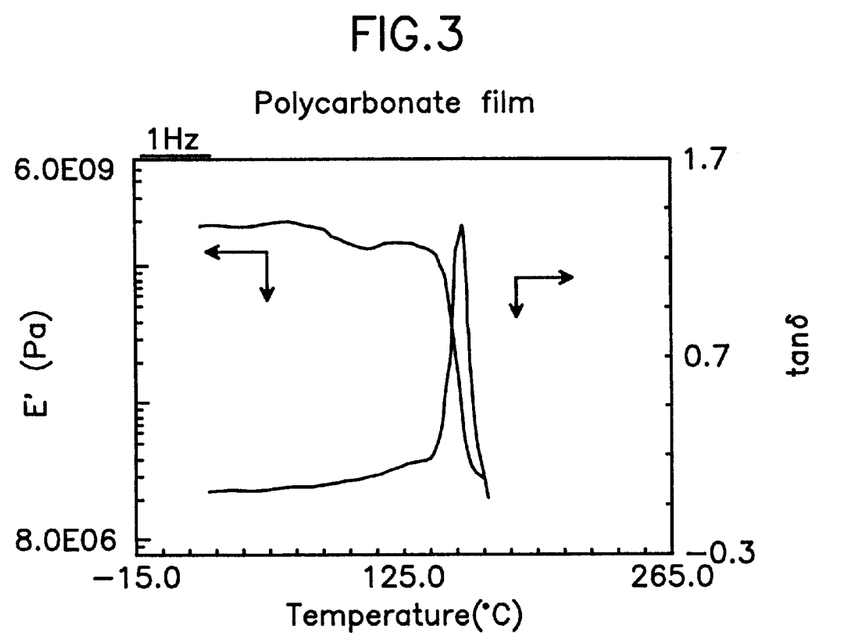
FIG. 3 shows a characteristic curve obtained by the dynamic mechanical analysis of the polycarbonate film prepared in Comparative Example 1.

Hardness, viscoelasticity, and tensile strength of the PC film were tested. The results were shown in Table 1. The characteristic curves obtained by the dynamic mechanical analytic measurement were shown in FIG. 3.

Where FIG. 2 and FIG. 3 are compared. In the polycarbonate film (PC film) of Comparative Example 1, the elastic modulus curve begins to decrease immediately around 140° C., over the glass transition temperature, the film becomes soft and melts at around 170° C. In the silyl group crosslinked polycarbonate film (PCS film) of Example 14, the elastic modulus curve also begins to decrease around 140° C., but the degree of decreasing is smaller than that of Comparative Example 1, giving relatively wide glass transition region, the film becomes soft and melts at around 230° C. That is, the PCS film of the present invention holds its form up to around 230° C., and shows about 60° C. higher heat resistance than the commercially available polycarbonate film.

Comparative Example 2

PC-diol (0.39 g) having a number average molecular weight of 3900 was dissolved into 4 g of THF. To this was added 0.03 g of 1N aqueous hydrochloric acid, and vigorously stirred at room temperature for 1 hour.

The resulting solution was placed in a wide mouthed bottle, and a solvent was allowed to evaporate at room temperature for 24 hours. The resulting residue did not form a film but formed white powder.

Comparative Example 3

Substantially the same procedure as described in Comparative Example 2 was repeated, except that 1N aqueous hydrochloric acid was not added. The resulting residue did not form a film but formed white powder.

Comparative Example 4

PC-diol (0.39 g) having a number average molecular weight of 8600 was dissolved into 4 g of THF. To this was added 0.015 g of 1N aqueous hydrochloric acid, vigorously stirred at room temperature for 1 hour.

The resulting solution was treated as described in Comparative Example 1. The resulting residue did not form a film but formed white powder.

Comparative Example 5

Substantially the same procedure as described in Comparative Example 4 was repeated, except that 1N aqueous hydrochloric acid was not added. The resulting residue did not form a film but formed white powder.

Comparative Example 6

The alkoxysilylated polycarbonate (0.39 g) having a number average molecular weight of 4400 was dissolved into 4 g of THF. The solution was placed in a wide mouthed bottle, and a solvent was allowed to evaporate at room temperature for 24 hours. The resulting residue did not form a film but formed white fine mass.

Comparative Example 7

The alkoxysilylated polycarbonate (0.39 g) having a number average molecular weight of 9400 was dissolved into 4 g of THF. The solution was treated as described in Comparative Example 6. The resulting residue did not form a film but formed white fine mass.

TABLE 1

Film Properties of PCS Materials

| Exam. No. | Heat Temp[1] (° C.) | Hard.[2] | Tg[3] (° C.) | Tensile Streng.[4] (× 10⁶ Pa) | Tensile Elong.[5] (%) | Tensile Elast.[6] (× 10⁶ Pa) |
|---|---|---|---|---|---|---|
| CEx. 1[7] | 120 | HB | 156 | 54 | 63.1 | 1730 |
| Ex. 9 | 150 | 5H | 155 | 73 | 3.7 | 2750 |
| Ex. 10 | 150 | 6H | 161 | 80 | 7.0 | 2690 |
| Ex. 11 | 150 | 4H | 191 | 75 | 9.2 | 2650 |
| Ex. 12 | 160 | 6H | 156 | 78 | 5.4 | 2720 |
| Ex. 13 | 160 | 6H | 157 | 81 | 6.9 | 2690 |
| Ex. 14 | 160 | 4H | 165 | 75 | 9.3 | 2650 |

[1] Heat treatment temperature
[2] Surface Hardness: Pencil scratch test, JIS K 5400; (Soft) 6B to B, HB, F, H to 9H (Hard)
[3] Glass Transition Temperature: tan δ peak measured by dynamic mechanical analysis
[4] Tensile Yield Strength: JIS K 7127
[5] Tensile Elongation at Break: JIS K 7127
[6] Tensile Elasticity: JIS K 7127
[7] Commercially available polycarbonate Table 1 shows that the glass transition temperature, the surface hardness, the tensile yield strength, and the tensile elasticity of the PCS film of the present invention are higher, and the tensile elongation is lower, than those of the commercially available PC film. That is, the PCS film of the present invention shows more excellent heat resistance and mechanical strength than those of the commercially available PC film.

Example 15

The PCS (1.20 to 1.80 g) prepared in Example 1 and tetramethoxysilane oligomer commercially available as the trade name of "MKC SILICATE MS-56" (TMOS) (0.20 to 0.80 g) were dissolved in 20 ml of THF at room temperature. To the solution was added 0.12 to 0.66 g of 1N aqueous hydrochloric acid, and vigorously stirred at room temperature for 1 hour to conduct hydrolysis.

The resulting solution was respectively coated on a polyamide substrate (2 mm in thickness) and a polyethylene film (30 μm in thickness) by using a spin coater to obtain a silica/PCS film having a composition by weight of PCS/TMOS=9/1 to 1/9. The solution was separately casted in a stainless dish covered with Teflon at room temperature, a solvent was allowed to evaporate to obtain a transparent and suitable film (silica/PCS film) having a composition by weight of PCS/TMOS=9/1 to 1/9.

The film formed on the polyamide substrate was used at the following hardness test, the film formed on the polyethylene film was used at the following gas-barrier test, and the casted film was used at the following scanning electron microscope (SEM) observation and the following dynamic mechanical analysis.

Example 16

The PCS (0.20 to 1.80 g) prepared in Example 2 and TMOS (0.20 to 0.80 g) were dissolved in 20 ml of THF at room temperature. To the solution was added 0.10 to 0.66 g of 1N aqueous hydrochloric acid, and vigorously stirred at room temperature for 1 hour to conduct hydrolysis.

The resulting solution was respectively coated on a polyamide substrate (2 mm in thickness) and a polyethylene film (30 μm in thickness) by using a spin coater to obtain a silica/PCS film having a composition by weight of PCS/TMOS=9/1 to 1/9. The solution was separately casted in a stainless dish covered with Teflon at room temperature, a solvent was allowed to evaporate to obtain a transparent and suitable silica/PCS film having a composition by weight of PCS/TMOS=9/1 to 1/9.

Example 17

The PCS (0.20 to 1.80 g) prepared in Example 1 and tetraethoxysilane (TEOS) (0.20 to 1.80 g) were dissolved in 20 ml of THF at room temperature. To the solution was added 0.12 to 0.63 g of 1N aqueous hydrochloric acid, and vigorously stirred at room temperature for 1 hour to conduct hydrolysis.

The resulting solution was respectively coated on a polyamide substrate (2 mm in thickness) and a polyethylene film (30 μm in thickness) by using a spin coater to obtain a silica/PCS film having a composition by weight of PCS/TEOS=9/1 to 1/9. The solution was separately casted in a stainless dish covered with Teflon at room temperature, a solvent was allowed to evaporate to obtain a transparent and suitable silica/PCS film having a composition by weight of PCS/TEOS=9/1 to 1/9.

Example 18

The PCS (0.20 to 1.80 g) prepared in Example 2 and TEOS (0.20 to 1.80 g) were dissolved in 20 ml of THF at room temperature. To the solution was added 0.36 to 0.63 g of 1N aqueous hydrochloric acid, and vigorously stirred at room temperature for 1 hour to conduct hydrolysis.

The resulting solution was respectively coated on a polyamide substrate (2 mm in thickness) and a polyethylene film (30 μm in thickness) by using a spin coater to obtain a silica/PCS film having a composition by weight of PCS/TEOS=9/1 to 1/9. The solution was separately casted in a stainless dish covered with Teflon at room temperature, a solvent was allowed to evaporate to obtain a transparent and suitable silica/PCS film having a composition by weight of PCS/TEOS=9/1 to 1/9.

Comparative Example 8

A polycarbonate resin (2.00 g) having a number average molecular weight of 36000, commercially available as the trade name of "IUPILON" from Mitsubishi Engineering Plastics K.K., was dissolved into 50 ml of dichloromethane. The resulting solution was coated on a polyamide substrate (2 mm in thickness) and a polyethylene film (30 μm in thickness) by using a spin coater to obtain a polycarbonate film (PC film). The solution was separately casted in a stainless dish covered with Teflon at room temperature, a solvent was allowed to evaporate to obtain a transparent PC film.

Example 19

The PCS (2.00 g) prepared in Example 1 was dissolved in 20 ml of THF at room temperature. To the solution was added 0.05 g of 1N aqueous hydrochloric acid, and vigorously stirred at room temperature to conduct hydrolysis. The resulting solution was respectively coated on a polyamide substrate (2 mm in thickness) and a polyethylene film (30 μm in thickness) by using a spin coater to obtain a PCS film. The solution was separately casted in a stainless dish covered with Teflon at room temperature, a solvent was allowed to evaporate to obtain a transparent PCS film.

Example 20

The PCS (2.00 g) prepared in Example 2 was dissolved in 20 ml of THF at room temperature. To the solution was added 0.03 g of 1N aqueous hydrochloric acid, and vigorously stirred at room temperature to conduct hydrolysis. The resulting solution was respectively coated on a polyamide substrate (2 mm in thickness) and a polyethylene film (30 $\mu$m in thickness) by using a spin coater to obtain a PCS film. The solution was separately casted in a stainless dish covered with Teflon at room temperature, a solvent was allowed to evaporate to obtain a transparent PCS film.

Comparative Example 9

TMOS (2.00 g) was dissolved into 20 ml of THF. To the solution was added 0.72 g of 1N aqueous hydrochloric acid, and vigorously stirred at room temperature for 1 hour to conduct hydrolysis. The resulting solution was coated on a polyethylene film (30 $\mu$m in thickness) by using a spin coater to obtain a transparent silica film. The solution was separately casted in a stainless dish covered with Teflon at room temperature, a solvent was allowed to evaporate to obtain a transparent silica film.

Comparative Example 10

TEOS (2.00 g) was dissolved into 20 ml of THF. To the solution was added 0.70 g of 1N aqueous hydrochloric acid, and vigorously stirred at room temperature for 1 hour to conduct hydrolysis. The resulting solution was coated on a polyethylene film (30 $\mu$m in thickness) by using a spin coater to obtain a transparent silica film. The solution was separately casted in a stainless dish covered with Teflon at room temperature, a solvent was allowed to evaporate to obtain a transparent silica film.

Comparative Example 11

"IUPILON" polycarbonate resin (0.60 g) and TEOS (1.40 g) were dissolved into 50 ml of THF. To the solution was added 0.49 g of 1N aqueous hydrochloric acid, and vigorously stirred at room temperature for 1 hour. In order to obtain a sol-gel film having a composition by weight of PC/TEOS=3/7, the resulting solution was casted in a stainless dish covered with Teflon at room temperature, a solvent was allowed to evaporate. However the residue did not form a suitable film but formed a shrunk, brittle, and white film having clacks.

Comparative Example 12

"IUPILON" polycarbonate resin (0.60 g) and TEOS (1.40 g) were dissolved into 50 ml of THF. In order to obtain a sol-gel film having a composition by weight of PC/TEOS= 3/7, the resulting solution was casted in a stainless dish covered with Teflon at room temperature, a solvent was allowed to evaporate. However the residue did not form a suitable film but formed a shrunk, brittle, and white film having clacks.

Scanning Electron Microscope (SEM) Observation

Cross sections of the films prepared in Examples 15 to 20, and Comparative Examples 8 to 12 were observed by using the "JSM-5800 LVC" type scanning electron microscopy manufactured by JEOL K.K.

The PC film prepared in Comparative Example 8, and the silica film prepared in Comparative Examples 9 and 10, were observed to be smooth. The PC/TEOS sol-gel film prepared in Comparative Example 11, and the PC/TEOS mixed and casted film prepared in Comparative Example 12, were observed to have many voids in more than 10 $\mu$m of diameter.

On the other hand, in all the silica/PCS films of the present invention prepared in Examples 15 to 20, phase separation and voids could not be observed.

Figure 4:
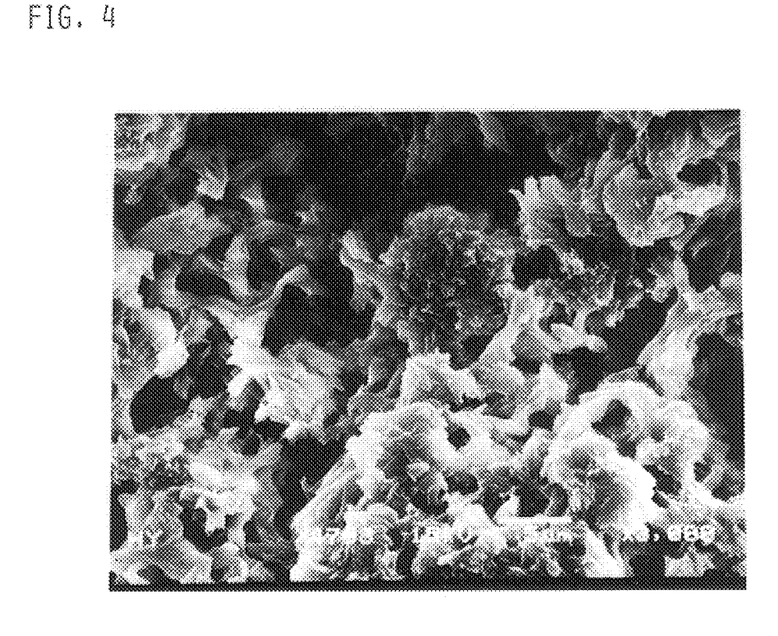
FIG. 4 shows a SEM photograph of the sol-gel material having PC/TEOS=3/7 prepared in Comparative Example 11.
Figure 5:
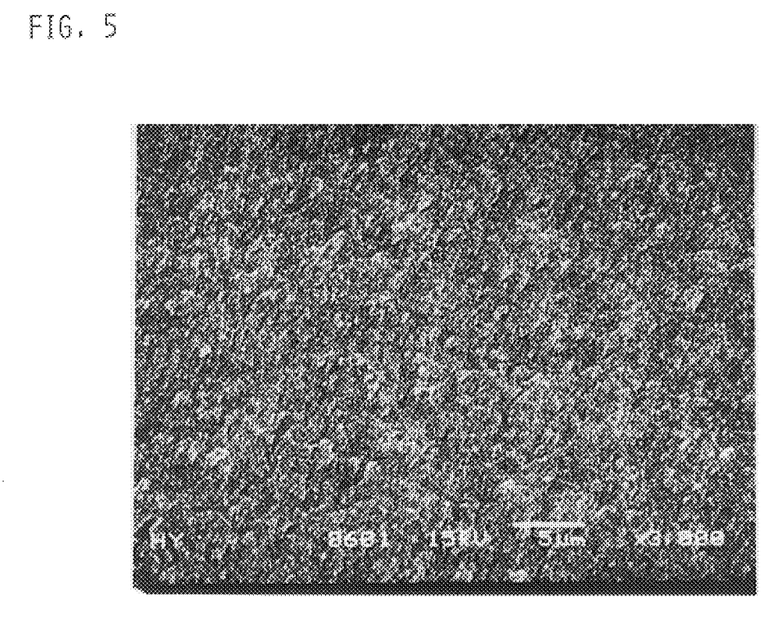
FIG. 5 shows a SEM photograph of the silica/PCS material having PCS/TEOS=3/7 prepared in Example 17.

FIG. 4 shows the SEM photograph of the film having a composition by weight of PC/TEOS=3/7 prepared in Comparative Example 11. FIG. 5 shows the SEM photograph of the film having a composition by weight of PCS/TEOS=3/7 prepared in Example 17.

Dynamic Mechanical Analysis

The viscoelasticity of the films prepared in Examples 15 to 20, and Comparative Examples 8 to 10 was measured. The glass transition temperature (Tg) was determined from the tan $\delta$ peak temperature. The elastic modulus was determined as E' curve. Prior to the measurement, PCS films or silica/PCS films of Examples 15 to 20, and silica films of Comparative Examples 9 and 10 were kept at 150° C. for 6 hours, and PC film of Comparative Example 8 was kept at 120° C. for 6 hours.

As a measuring apparatus, the viscoelasticity spectrometer model SDM 5600 manufactured by Seiko Denshi Kogyo Co. Ltd. was employed. As a sample, the test piece having a size of 25 mm length×10 mm width was prepared from the film and employed. The measurement was conducted under the tensile mode at a frequency of 1 Hz, and in the temperature range from 25 to 300° C. with temperature increasing rate of 2° C./minute.

Figure 6:
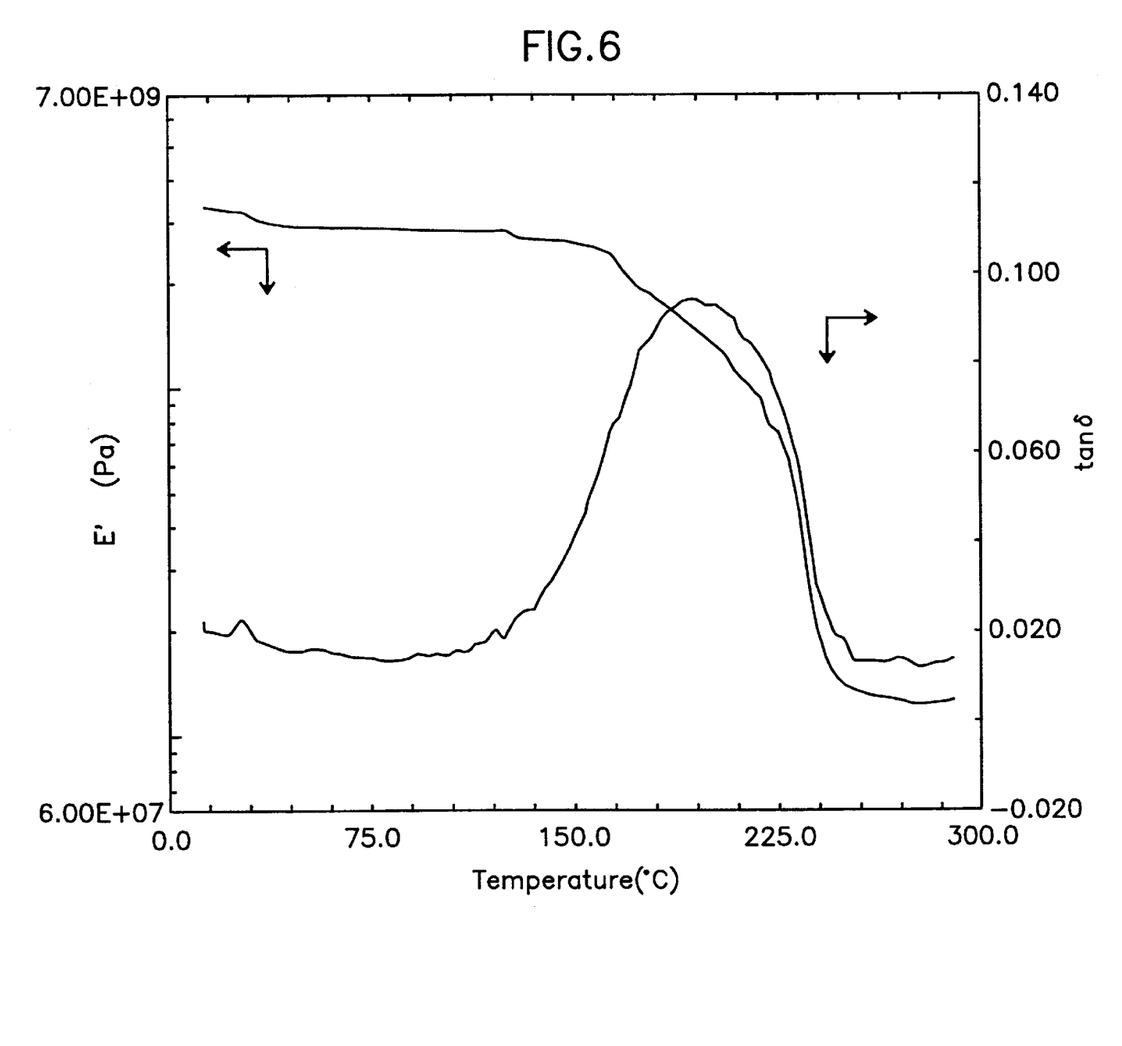
FIG. 6 shows a characteristic curve obtained by the dynamic mechanical analysis of the silica/PCS film having PCS/TMOS=7/3 prepared in Example 16.

The results of the measurement were shown in Table 2. FIG. 6 shows the characteristic curve of the film having a composition by weight of PCS/TEOS=7/3 prepared in Example 16.

The glass transition temperature of the silica/PCS material of the present invention is 10 to 55° C. higher than that of the commercially available PC or the PCS. The glass transition temperature increases with increasing the content of the silica component.

It is reasoned that the PC component is chemically bound to the silica component, the movement of the PC molecule being suppressed. Consequently, the glass transition temperature became higher.

The elastic modulus at 280° C. also increases with increasing the content of the silica component. The PCS/TMOS or PCS/TEOS=5/5 and 3/7 composition films have improved modulus due to the hybrid effect, showing the excellent heat resistance even at higher temperature.

The heat resistance was expected to increase with increasing the content of the silica component. In PCS/TMOS or PCS/TEOS=1/9 composition films, however, their heat resistance were failed to measure because of the distraction of the test piece.

In the PC film, over its transition temperature, its elastic modulus begins to decrease immediately at around 140° C. and then the film becomes soft and melts at around 170° C. On the other hand, the elastic modulus of the PCS film lowers gradually, and then the film becomes soft and melts at around 220° C. In the silica/PCS film, the decrease in its elastic modulus stops at around 220 to 240° C. and then its elastic modulus curve has a plateau at around 280 to 300°. This result shows that the heat resistance of the silica/PCS film is about 100° C. higher than that of the commercially available PC film.

TABLE 2

Physical Heat Resistance of silica/PCS Materials

| Exam. No. | Composition (weight ratio) | Film Thick. (μm) | Tg[1] (° C.) | Elastic A[2] (× 10⁹ Pa) | Elastic B[3] (× 10⁹ Pa) |
|---|---|---|---|---|---|
| CEx. 8 | (PC) | 117 | 156 | 1.4 | — |
| Ex. 19 | (PCS) | 216 | 155 | 3.1 | — |
| Ex. 20 | (PCS) | 190 | 161 | 2.8 | — |
| Ex. 15 | PCS/TMOS = 9/1 | 205 | 168 | 2.5 | 2.1 |
|  | 7/3 | 114 | 176 | 2.5 | 7.5 |
|  | 5/5 | 109 | 178 | 1.6 | 33 |
|  | 3/7 | 92 | 192 | 2.1 | 50 |
|  | 1/9 | 85 | — | — | — |
| Ex. 16 | PCS/TMOS = 9/1 | 145 | 174 | 3.4 | 3.1 |
|  | 7/3 | 147 | 192 | 2.9 | 12 |
|  | 5/5 | 88 | 202 | 1.7 | 38 |
|  | 3/7 | 101 | 209 | 2.4 | 74 |
|  | 1/9 | 96 | — | — | — |
| Ex. 17 | PCS/TEOS = 9/1 | 197 | 171 | 3.1 | 2.5 |
|  | 7/3 | 174 | 176 | 2.5 | 9.3 |
|  | 5/5 | 131 | 182 | 1.9 | 29 |
|  | 3/7 | 120 | 196 | 2.3 | 58 |
|  | 1/9 | 81 | — | — | — |
| Ex. 18 | PCS/TEOS = 9/1 | 162 | 172 | 2.6 | 2.6 |
|  | 7/3 | 108 | 186 | 1.8 | 11 |
|  | 5/5 | 116 | 191 | 1.7 | 34 |
|  | 3/7 | 100 | 198 | 1.7 | 76 |
|  | 1/9 | 85 | — | — | — |
| CEx. 9 | (TMOS) | 82 | — | — | — |
| CEx. 10 | (TEOS) | 77 | — | — | — |

[1] Glass transition temperature determined from tan δ peak
[2] Elastic modulus at 100° C. determined from E' curve
[3] Elastic modulus at 280° C. determined from E' curve

TABLE 3

Hardness of Silica/PCS Materials

| Exam. No. | Composition | Film Thick. | Pencil Hard. |
|---|---|---|---|
| CEx. 8 | (PC) | 3 μm | HB |
| Ex. 19 | (PCS) | 3 μm | 5H |
| Ex. 20 | (PCS) | 3 μm | 6H |
| Ex. 15 | PCS/TMOS = 9/1 | 4 μm | 5H |
|  | 7/3 | 4 μm | 5H |
|  | 5/5 | 4 μm | 5H |
|  | 4/6 | 3 μm | 6H |
|  | 3/7 | 3 μm | 7H |
|  | 2/8 | 3 μm | 7H |
|  | 1/9 | 2 μm | 9H |
| Ex. 16 | PCS/TMOS = 9/1 | 4 μm | 6H |
|  | 7/3 | 3 μm | 6H |
|  | 5/5 | 3 μm | 6H |
|  | 3/7 | 3 μm | 7H |
|  | 1/9 | 2 μm | 9H |
| Ex. 17 | PCS/TEOS = 9/1 | 4 μm | 5H |
|  | 7/3 | 3 μm | 5H |
|  | 5/5 | 3 μm | 5H |
|  | 4/6 | 3 μm | 5H |
|  | 3/7 | 2 μm | 8H |
|  | 2/8 | 2 μm | 8H |
|  | 1/9 | 2 μm | 9H |
| Ex. 18 | PCS/TEOS = 9/1 | 3 μm | 6H |
|  | 7/3 | 3 μm | 6H |
|  | 5/5 | 3 μm | 6H |
|  | 3/7 | 2 μm | 7H |
|  | 1/9 | 2 μm | 9H |

Hardness Measurement

The pencil hardness of the films formed on the polyamide substrates in Examples 15 to 20 and Comparative Example 8 was measured. Prior to the measurement, PCS films or silica/PCS films of Examples 15 to 20 were left in the chamber at 150° C. for 6 hours, and PC film of Comparative Example 8 was left at 120° C. for 6 hours. Then, the films are left for 48 hours in the constant room at 23° C. and 50% humidity.

As a measuring apparatus, PEELING/SLIPPING/SCRATCHING TESTER MODEL HEIDON-14 manufactured by HEIDON Co., Ltd. and MITSUBISHI UNI pencil manufactured by Mitsubishi Pencil K.K. were used. The measurement was performed with reference to JIS K 5400, that is, pencil scratching test. The platform moving rate was 30 mm/min, and the load was 1.00 kgf. The results are shown in Table 3.

The hardness of the silica/PCS materials were remarkably higher than that of the commercially available PC material. The hardness increased with increasing the content of the silica component. At a composition by weight of PCS/TMOS or PCS/TEOS=1/9 film shows the pencil hardness equal to that of glass.

Gas-Barrier Ability Measurement

The gas-barrier ability of the films formed on the polyethylene films in Examples 15 to 20 and Comparative Examples 8 to 10 was measured. Prior to the measurement, all the films were heated at 60° C. for 48 hours, dried in vacuo at 25° C. for 48 hours, followed by drying in desiccator using calcium chloride at 23° C. for 48 hours.

As a measuring apparatus, the gas permeability measuring apparatus model M-C3 manufactured by Toyo Seiki Seisakusho Co. Ltd. was employed. The measurement was conducted with reference to the differential pressure method of JIS K 7126 the test for gas permeability of plastic film and sheet, on condition that the cell adaptor was 0 cc, the permeation area was 38.46 cm², and the pressure of the high-pressure side was 780 mmHg. The results are shown in Table 4.

The gas-barrier ability of the silica/PCS materials of the present invention are generally superior to that of the commercially available PC material. The silica/PCS film of the PCS/TMOS or PCS/TEOS=4/6 to 2/8 composition is particularly excellent in the gas-barrier ability.

Silica material (glass) is well-known as the material having high gas-barrier ability. Whereas the gas-barrier ability of the silica film prepared by the sol-gel method was not so high because many pores are formed in the silica film. And those pores are partially connected, and some connection penetrate through the film.

However, in the case of the silica/PCS film, it is considered that the pores is filled with the polycarbonate segment. Therefore the gas-barrier ability of the film is generally improved higher with increasing the content of the polycarbonate component.

However, in higher content of the polycarbonate component, the gas-barrier ability of the film became lower.

This is because polycarbonate component exists enough to fill the pores of the silica, and the gas-barrier ability of the polycarbonate film is lower than that of the silica.

When PCS/TMOS or PCS/TEOS=3/7, the silica/PCS film was most excellent in gas-barrier property. Therefore, the pores of the silica film are suitably filled with the polycarbonate component at that composition.

TABLE 4

Oxygen Transmission Coefficient of silica/PCS Materials

| Exam. No. | Composition (weight ratio) | Film Thickness ($\mu$m) | Oxygen Trans. Coeff. ($\times 10^{-11}$ cm$^3$ · cm/cm$^2$ · sec · cm Hg) |
|---|---|---|---|
| CEx. 8 | (PC) | 12 | 7.7 |
| Ex. 19 | (PCS) | 11 | 7.5 |
| Ex. 20 | (PCS) | 12 | 7.4 |
| Ex. 15 | PCS/TMOS = 9/1 | 11 | 6.3 |
|  | 7/3 | 12 | 6.6 |
|  | 5/5 | 10 | 5.8 |
|  | 4/6 | 9 | 2.8 |
|  | 3/7 | 9 | 2.5 |
|  | 2/8 | 7 | 3.8 |
|  | 1/9 | 7 | 7.8 |
| Ex. 16 | PCS/TMOS = 9/1 | 11 | 6.8 |
|  | 7/3 | 10 | 6.4 |
|  | 5/5 | 9 | 5.7 |
|  | 3/7 | 8 | 2.5 |
|  | 1/9 | 6 | 7.7 |
| Ex. 17 | PCS/TEOS = 9/1 | 12 | 7.0 |
|  | 7/3 | 10 | 6.3 |
|  | 5/5 | 10 | 5.5 |
|  | 4/6 | 8 | 2.9 |
|  | 3/7 | 8 | 2.3 |
|  | 2/8 | 7 | 4.1 |
|  | 1/9 | 6 | 7.6 |
| Ex. 18 | PCS/TEOS = 9/1 | 12 | 6.3 |
|  | 7/3 | 11 | 6.5 |
|  | 5/5 | 12 | 6.0 |
|  | 3/7 | 10 | 2.6 |
|  | 1/9 | 8 | 7.2 |
| CEx. 9 | (TMOS) | 6 | 24 |
| CEx. 10 | (TEOS) | 7 | 21 |

What is claimed is:

1. An organic-inorganic hybrid polymer material obtained by the process in which a polymer having a polycarbonate and/or a polyarylate moiety as a main frame, a metal alkoxide group as a functional group, a number average molecular weight of from 500 to 50000 as measured by GPC, and a metal alkoxide group equivalent weight of from 1 to 100, is hydrolyzed and polycondensed to form crosslinkages wherein the organic-inorganic hybrid polymer material has high heat resistance, mechanical strength, water resistance and surface hardness.

2. The organic-inorganic hybrid polymer material according to claim 1, wherein a metal element of the metal alkoxide is at least one selected from the group consisting of Si, Ti, and Zr.

3. The organic-inorganic hybrid polymer material according to claim 1, wherein a metal element of the metal alkoxide is Si.

4. A process for preparing an organic-inorganic hybrid polymer material comprising a step in which a polymer having a polycarbonate and/or a polyarylate moiety as a main frame, a metal alkoxide group as a functional group, a number average molecular weight of from 500 to 50000 as measured by GPC, and a metal alkoxide group equivalent weight of from 1 to 100, is hydrolyzed and polycondensed to form crosslinkages, wherein the organic-inorganic hybrid polymer material has high heat resistance, mechanical strength, water resistance and surface hardness.

5. The process according to claim 4, wherein a metal element of the metal alkoxide is at least one selected from the group consisting of Si, Ti, and Zr.

6. The process according to claim 4, wherein a metal element of the metal alkoxide is Si.

7. A polymer having a polycarbonate and/or a polyarylate moiety as a main frame, a metal alkoxide group as a functional group, a number average molecular weight of from 500 to 50000 as measured by GPC, and a metal alkoxide group equivalent weight of from 1 to 100, wherein an organic-inorganic hybrid polymer material which is prepared by hydrolyzing and polycondensing the polymer has high heat resistance, mechanical strength, water resistance and surface hardness.

8. A process for preparing the polymer as set forth in claim 7, comprising a step in which a polymer having at least one functional group in the molecule, a polycarbonate and/or a polyarylate moiety as a main frame, and a number average molecular weight of from 500 to 50000 as measured by GPC, is allowed to react with metal alkoxide having a functional group which can react with the functional group of the polymer, in an amount so that the equivalent weight ratio of a functional group contained in the metal alkoxide based on that of the polymer is 1/10 to 100, wherein an organic-inorganic hybrid polymer material which is prepared by hydrolyzing and polycondensing the polymer has high heat resistance, mechanical strength, water resistance and surface hardness.

9. An organic-inorganic hybrid polymer material obtained by the process in which a polymer having a polycarbonate and/or a polyarylate moiety as a main frame, a metal alkoxide group as a functional group, a number average molecular weight of from 500 to 50000 as measured by GPC, and a metal alkoxide group equivalent weight of from 1 to 100; and a metal alkoxide compound are cohydrolized and copolycondensed in the weight ratio of from 1:9 to 9:1 to form crosslinkages, wherein the organic-inorganic hybrid polymer material has high heat resistance, mechanical strength, surface hardness, gas-barrier ability, water resistance and transparency.

10. The organic-inorganic hybrid polymer material according to claim 9, wherein a metal element of the metal alkoxide is at least one selected from the group consisting of Si, Ti, and Zr.

11. The organic-inorganic hybrid polymer material according to claim 9, wherein a metal element of the metal alkoxide is Si.

12. The organic-inorganic hybrid polymer material according to claim 9, wherein a weight ratio of the polymer and the metal alkoxide compound is from 1:99 to 99:1.

13. The organic-inorganic hybrid polymer material according to claim 12 having excellent heat resistance, wherein the metal alkoxide compound is contained in an amount of not less than 10% by weight.

14. The organic-inorganic hybrid polymer material according to claim 12 having excellent surface hardness, wherein the metal alkoxide compound is contained in an amount of not less than 10% by weight.

15. A plastic molded article, a film material, a sealing agent, an adhesive agent, a binder for coating, a constructive material, an optical material, a polymer silane coupling agent, a resin additive, a surface modifying agent, a hard coating agent, an electric or an electronic material, a medical material, or a filler material, comprised of the organic-inorganic hybrid polymer material according to claim 9.

16. A process for preparing an organic-inorganic hybrid polymer material comprising a step in which a polymer having a polycarbonate and/or a polyarylate moiety as a main frame, a metal alkoxide group as a functional group, a number average molecular weight of from 500 to 50000 as measured by GPC, and a metal alkoxide groupp equivalent weight of from 1 to 100; and a metal alkoxide compound are cohydrolyzed and polycondensed in the weight ratio of from 1:9 to 9:1 to form crosslinkages, wherein the organic-inorganic hybrid polymer material has high heat resistance, mechanical strength, surface hardness, gas-barrier ability, water resistance and transparency.

17. The organic-inorganic hybrid polymer material according to claim 1, which has a surface hardness of not less than 4 H as measured by the pencil strength of JIS K 5400.

18. The organic-inorganic hybrid polymer material according to claim 9, which has a surface hardness of not less t6han 5 H as measured by the pencil strength of JIS K 5400.

* * * * *